XR 3,780,217

United States

Sawatari

[11] 3,780,217

[45] Dec. 18, 1973

[54] HETERODYNE IMAGING DEVICE FOR PROVIDING HIGH RESOLUTION IMAGES

[75] Inventor: Takeo Sawatari, Birmingham, Mich.

[73] Assignee: The Bendix Corporation, Southfield, Mich.

[22] Filed: May 11, 1972

[21] Appl. No.: 252,232

[52] U.S. Cl. ................ 178/6, 178/DIG. 27, 350/3.5

[51] Int. Cl. .......................... H04n 1/26, H04n 7/18

[58] Field of Search ..... 178/DIG. 27, 6, 6.5; 350/3.5

[56] References Cited

UNITED STATES PATENTS 3,644,665 2/1972 Enloe .................................. 178/6.5

*Primary Examiner*—Howard W. Britton

*Attorney*—John S. Bell et al.

[57] ABSTRACT

Several heterodyne microscopes are illustrated herein in which light from a point source is directed to interfere with light scattered from an object to provide a large area interference pattern representing a point on that object. Scanning apparatus varies the interference pattern to represent different object points. Conventional heterodyne signal processing apparatus processes light from the interference pattern to provide an image. The resolution of the image is determined by the size of the point source and by the percentage of the area of the interference pattern from which the processing apparatus receives signals. A high resolution image is obtained by using a small pinhole aperture to provide the point source and by using a diffusive surface to receive and scatter light from the interference pattern to the signal processing apparatus.

10 Claims, 5 Drawing Figures

3780217

NO OR CLASSIF

HETERODYNE IMAGING DEVICE FOR PROVIDING HIGH RESOLUTION IMAGES

BACKGROUND OF THE INVENTION

1. Field of the Invention

Heterodyne imaging devices.

2. Brief Description of the Prior Art

A heterodyne imaging device is an imaging device in which an object beam or in other words a wavefront or beam representing an object is mixed with a reference wavefront or beam having a frequency slightly different from the frequency of the object beam to form a temperally varying interference pattern. In one prior art heterodyne device, a lens focusing the reference beam to a point so that the amplitude of the cylically varying interference pattern comprises an intensity representation of one object point. The interference pattern is varied to represent different object points by scanning the focused point across the object beam. Signal processing apparatus integrates the entire interference pattern and responds to amplitude variations in the integrated pattern that occur during the scanning of the focused point to provide an image of the object.

The resolution of the image provided by a heterodyne imaging device is partially determined by the sensitivity of the device to variations between signals representing different object points. The prior art teaches that a photodiode or similar signal converting device that provides input information to electronic signal processing apparatus must receive the entire wavefront from the object in order to provide a sufficiently strong signal that undergoes sufficiently large amplitude variations as the focused point is scanned across the object beam to enable the processing apparatus to respond to the signal variations and provide a high resolution image. However, signal converting devices such as photodiodes having large signal receiving areas are so costly that it has not been considered practical to build a heterodyne imaging device having a large field of view and high resolution for forming images of general objects that scatter wave energy over a wide area. The prior art heterodyne devices are, therefore, designed to form images of only certain special objects such as a transparent object carrying a coarse pattern that receives a collimated beam and modulates that beam to represent the pattern without significantly destroying the beam's collimation.

The resolution of the image provided by the prior art heterodyne imaging device described above is also partially determined by the power of the focusing lens. However, a high power lens such as a microscopic objective lens has such a short focal length that there is no room for scanning apparatus between the lens and focused point provided by the lens. A scanner such as a beam deflector must be placed upstream from the lens. However, a high power lens such as a microscope objective lens has a small aperture that limits scanning distances upstream from the lens and causes the imaging device to have only a very narrow field of view.

SUMMARY OF THE INVENTION

This invention comprises an inexpensive heterodyne imaging device having a large field of view for forming high resolution images of objects that scatter received wave energy over large areas. The heterodyne device includes apparatus for directing wave energy from a point source to interfere with wave energy scattered from an object to create a large area wavefront comprising an interference pattern representing a point on the object. The amplitude of the interference pattern of wavefront is varied to represent different object points. A diffusive surface is positioned to receive the interference pattern and scatter wave energy in all directions. Since the diffusive surface scatters wave energy in all directions, signal processing apparatus with a receiving element having a small signal receiving area positioned to receive wave energy from the diffusive surface will receive a portion of the wave energy scattered from each point on that surface. The percentage variations in the amplitude of the signal received by the small signal receiving area of the signal processing receiving element are equal to the percentage variations of wave energy received by the diffusive surface.

The diffusive surface thus enables the heterodyne imaging device to provide a high resolution image of an object that scatters received light, without requiring the processing apparatus to include a prohibiting expensive signal receiving device with a large signal receiving area. In contrast to the prior art heterodyne devices, the resolution of the image is independent of the signal receiving area of the processing apparatus and is instead determined by the size of the diffusive surface, or in other words by the portion of the interference pattern received by the diffusive surface. The diffusive surface also eliminates the need for any focusing lenses in the heterodyne device to provide a high resolution image. The diffusive surface thus permits a simple, all-reflective heterodyne device to be constructed. An embodiment of such a system using ultraviolet laser light, which does not propagate through glass and therefore cannot be used with a lens system is illustrated herein.

In two embodiments illustrated herein, a pinhole aperture is used to provide a point source of wave energy that interferes with wave energy reflected from an object. The resolution of the image provided by the device is determined by the size of the pinhole aperture as well as by the size of the diffusive surface. With a small pinhole aperture, images are obtained having as high a resolution as can be obtained with heterodyne systems employing even the highest powered and most expensive microscope objective lens to focus light to a point. In addition, the pinhole aperture permits the interference pattern to be varied to represent different object points by a simple and convenient scan. That is, it is only necessary to provide a relative scanning motion between the object and pinhole aperture to generate interference patterns representing different points on the object.

In one embodiment illustrated herein, a diffusive surface, pinhole aperture, and beam splitter for superimposing wave energy from the object and from the aperture to provide an interference pattern are aligned with each other. This alignment provides a compact arrangement of elements that permits the device to also include an additional diffusive surface, pinhole aperture, and beam splitter for intercepting other wave energy from the object and providing a second interference pattern. The apertures, beam splitters, and diffusive surfaces are positioned so that at each instant, both patterns represent the same object point. Signal processing apparatus combines signals from each diffusive surface to provide a larger signal that undergoes larger magnitude amplitude variations than the signal from either one diffusive surface. This signal is easily detected and has a high signal to noise ratio. The device thus provides a high resolution image.

In another embodiment illustrated herein, a hologram of a pinhole is used instead of an actual pinhole aperture to provide a plane wave representing a point source of wave energy. The hologram receives wave energy from an object, and also receives a reference beam to provide an interference pattern representing a point on the object. Different patterns representing different object points are produced by changing the angle at which the reference beam strikes the hologram and by changing the convergence of the reference beam.

BRIEF DESCRIPTION OF THE DRAWINGS

Further objects, features, and advantages of this invention, which is defined by the appended claims, will become apparent from a consideration of the following description and the accompanying drawings in which:

DETAILED DESCRIPTION OF THE PREFERRED EMBODIMENT

Figures 1, 2:
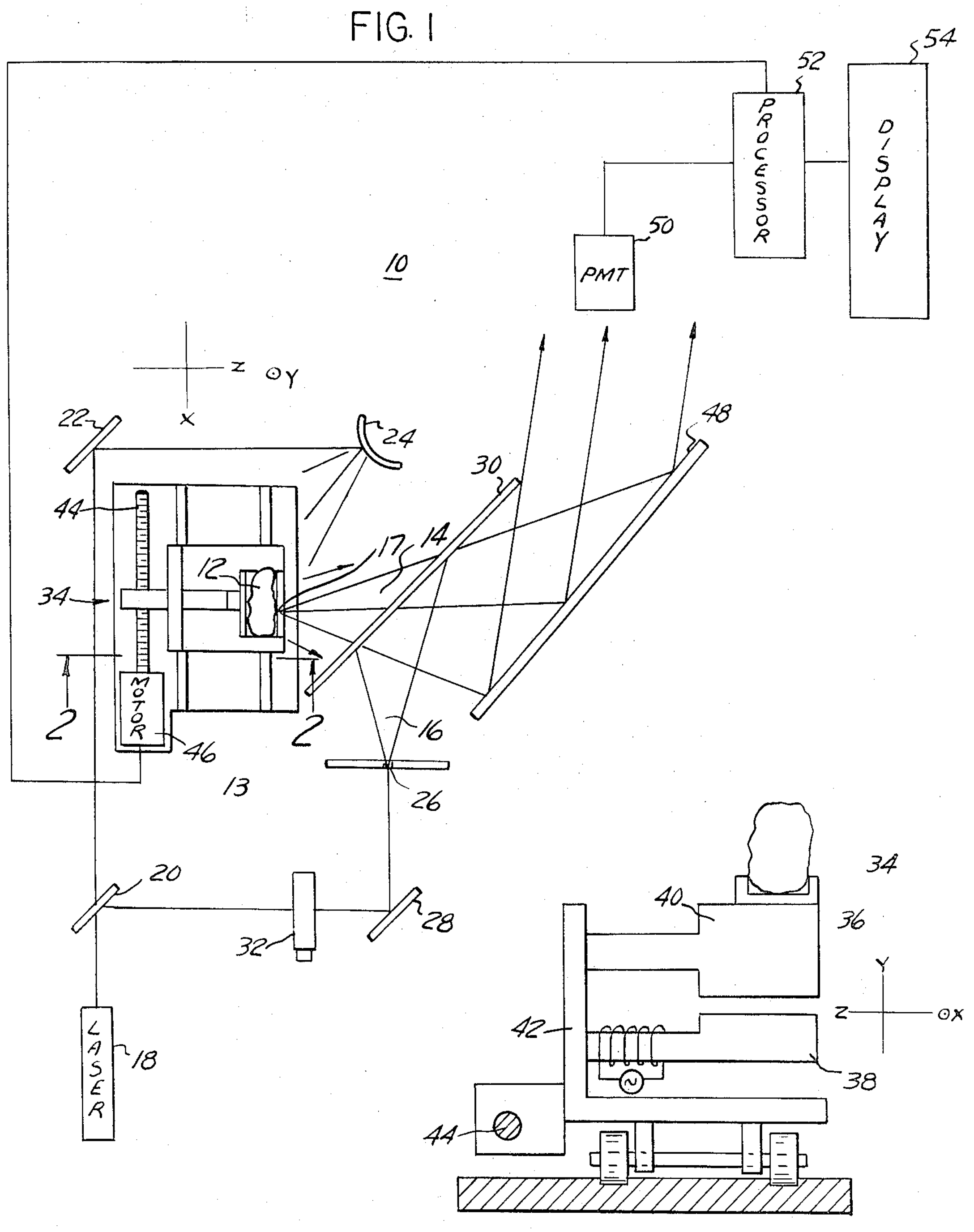
FIG. 1 is a schematic, plan view of a heterodyne imaging device having a diffusive surface for receiving interfering wave energy signals from an object and from a pinhole aperture and for scattering a portion of the received wave energy to signal processing apparatus.
FIG. 2 is a schematic, side view of a portion of the device of FIG. 1 that illustrates apparatus for scanning the object to vary the signals to represent different object points.

FIG. 1 illustrates a heterodyne microscope 10 for providing a high resolution image of an object 12. The microscope 10 includes apparatus 13 for providing an object wave energy signal 14 and a reference wave energy signal 16 directed to interfere with each other to provide an interference pattern representing one point 17 on the object 12. This apparatus 13 includes a laser generator 18, a beam splitter 20, and mirrors 22 and 24 for directing laser light to strike object 12 and be modulated and scattered by that object. Apparatus 13 also includes a mirror 28 for directing laser light to strike a pinhole aperture 26 and provide a reference signal 16 representing a point source of wave energy. A beam splitter 30 is positioned to superimpose wave energy signals 14 and 16 and cause those signals to interfere with each other. Beam splitter 30 is positioned to project a virtual image of aperture 26 onto one point 17 of object 12. The point on object 12 receiving this projection is the point represented by the interference pattern produced by signals 14 and 16. An acousto-optic frequency shifting device 32 is positioned to receive light traveling to aperture 26 and shift the frequency of signal 16 with respect to signal 14. An acousto-optic frequency shifter such as shifter 32 is a well known device having a crystal such as a quartz-crystal cut in a rectangular shape for receiving light from beam splitter 20, and apparatus for causing an acoustic wave to propagate through the quartz crystal. The frequency of received light is shifted by an amount determined by the frequency of the acoustic wave. The frequency shift provided by device 32 causes the interference pattern provided by signals 14 and 16 to be a temporally varying interference pattern having an amplitude representing the intensity of light propagating from the represented point on object 12. A diffuse reflecting surface 34 is positioned to receive the interference pattern provided by object signal 14 and reference signal 16.

In order to vary the interference pattern and thereby provide representations of different points on object 12, microscope 10 includes scanning apparatus 34 (also illustrated in FIG. 2) for scanning object 12 with respect to aperture 26. The scanning apparatus 34 includes an electromagnet 36 having a base arm 38 and a flexible arm 40 upon which object 12 is mounted. When an alternating electric current is supplied to electro-magnet 36, arm 40 flexes toward and away from base arm 38. This flexing comprises a vary rapid Y-axis scan and moves the scan point across object 12 along one dimension many times as that point is moved across object 12 along a perpendicular dimension a single time by mechanical drive motor 46.

A diffusive reflecting surface 48 is positioned to receive the interference pattern provided by signals 14 and 16. Surface 48 scatters received light in all directions. A photomultiplier tube 50 is positioned to receive light from surface 48 and convert received light signals to electric signals for processor 52 similar to the processing apparatus of prior art heterodyne devices. A display 54 is connected to receive signals from processor 52 and provide a high resolution image of object 12.

In operation, signals 14 and 16 interfere and provide a cyclic, temporally varying interference pattern. The amplitude of the interference pattern represents the intensity of light reflected from the point on object 12 onto which beam splitter 30 projects a virtual image of aperture 26. Object 12 is moved by scanning apparatus 34 so that the virtual image of point 26 is scanned across each point on object 12 and the amplitude of the interference pattern is varied to represent different points on that object. Surface 48 receives the interference pattern and scatters light in all directions. A portion of the light scattered from each point on surface 48 reaches photomultiplier tube 50. Tube 50 provides an electric output signal whose strength or amplitude at any one instant is proportional to the strength or intensity of all light received by the photomultiplier tube at that instant. The light signals received by photomultiplier tube 50 undergo percentage variations equal to the percentage variations of the amplitude of the interference signal received by diffusive surface 48 as that signal is varied to represent different points on object 12. Processor 52 thus receives an electric signal that undergoes amplitude variations corresponding to intensity variations in light reflected from different points on object 12. Processor 52 also receives position signals from scanning apparatus 34 identifying the locations of points on object 12 represented by signals received from tube 50. Processor 52 along with display 54 utilizes these intensity and position signals to provide an output intensity distribution pattern that is a high resolution image of object 12.

Figure 3:
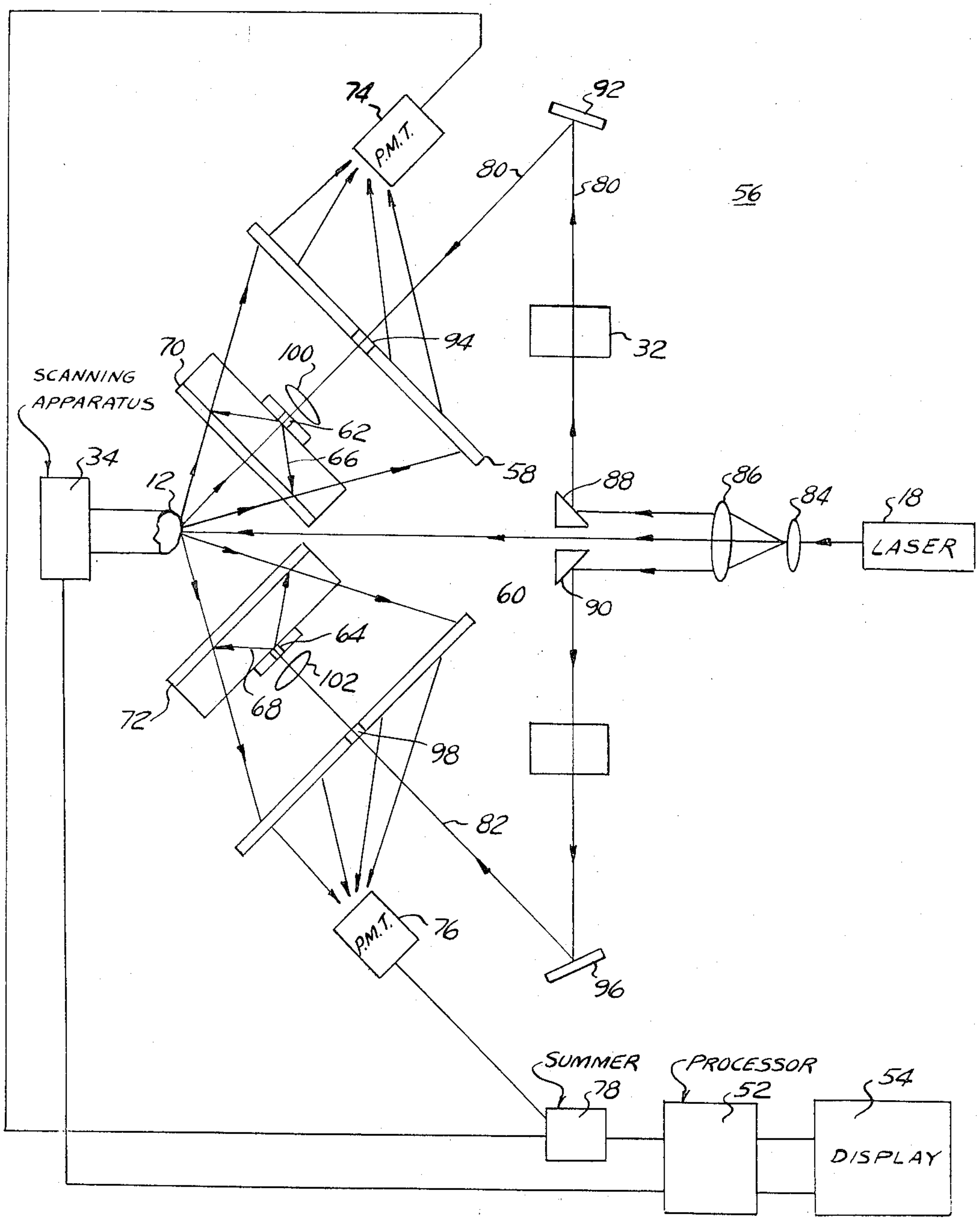
FIG. 3 is a schematic, plan view of a heterodyne imaging device that includes apparatus for generating several interference patterns representing an object point and for using the several patterns to provide a strong signal that is easily processed to provide a high resolution image.

FIG. 3 illustrates a heterodyne imaging device 56 that provides a stronger and thus more readily processed signal for processor 52 and display 54 than does the device 10 of FIG. 1. In order to obtain this stronger signal, device 56 includes apparatus for intercepting and using a greater portion of the light reflected from object 12 than does the device 10. This intercepting apparatus includes two transparent, ground or diffuse glass surfaces 58 and 60. Together, these glass surfaces intercept and use a greater portion of the light scattered from object 12 in forming an image than does the single diffuse reflecting surface 48 of imaging device 10. In order to project temporally varying interference patterns representing a point on object 12 onto surfaces 58 and 60, device 56 also includes pinhole apertures 62 and 64 for receiving wave energy and providing diverging wave energy reference signals 66 and 68 representing point sources of wave energy. Two beam splitters 70 and 72 receive signals 66 and 68 and combine those signals with light from object 12 to form interference signals that are intercepted by surfaces 58 and 60, respectively. Beam splitters 70 and 72 are positioned to project virtual images of apertures 62 and 64 onto the same point of object 12. The interference patterns received by surfaces 58 and 60 thus both represent the same point on object 12. Two photomultiplier tubes 72 and 74 receive light scattered from surfaces 58 and 60 respectively and convert scattered light signals to electric signals. A summer 78 receives and combines these electric signals for processor 52.

Imaging device 56 also includes apparatus for providing and directing two beams of laser light 80 and 82 to strike apertures 62 and 64 respectively and thereby generate reference distributions 66 and 68. This apparatus includes an objective lens 84 and a collimating lens 86 which expand and collimate the laser light output from generator 18 to form beam 87. Two mirrors 88 and 90 are positioned to intercept different portions of the beam 87 and reflect those received portions to provide beams 80 and 82 traveling in different directions. A mirror 92 is positioned to reflect beam 80 through an aperture 94 in surface 58 to pinhole aperture 62. And, a mirror 96 is positioned to direct beam 82 through an aperture 98 in surface 60 to pinhole aperture 64. Apertures 94 and 98 are sufficiently large so that they do not cause beams 80 and 82 to diverge and thus weaken signals 66 and 68. To further insure that signals 66 and 68 are strong signals, lenses 100 and 102 are positioned to focus beams 80 and 82 to pinhole apertures 62 and 64 respectively so that no portion of the beam will be blocked and not utilized in forming reference signals 66 and 68.

In operation, reference signals 66 and 68 interfere with light reflected from object 12 to provide temporally varying interference patterns having amplitudes representing the intensity of light reflected from one point on the object. The amplitudes of the interference signals vary as mechanical scanning apparatus 34 scans object 12 causing the interference patterns to represent different points across the object. The optic interference patterns are converted to electric signals by photomultiplier tubes 74 and 76. Summing device 78 combines these electric signals to provide a larger signal which undergoes amplitude variations of greater magnitude than the signal provided by either one photomultiplier tube. The signal provided by summing device 78 also has a high signal to noise ratio. The variations in this summation signal representing small differences between the intensity of light reflected from different points on object 12 are readily identified by processor 52. Imaging device 56 thus provides a high resolution image of that object.

Figure 4:
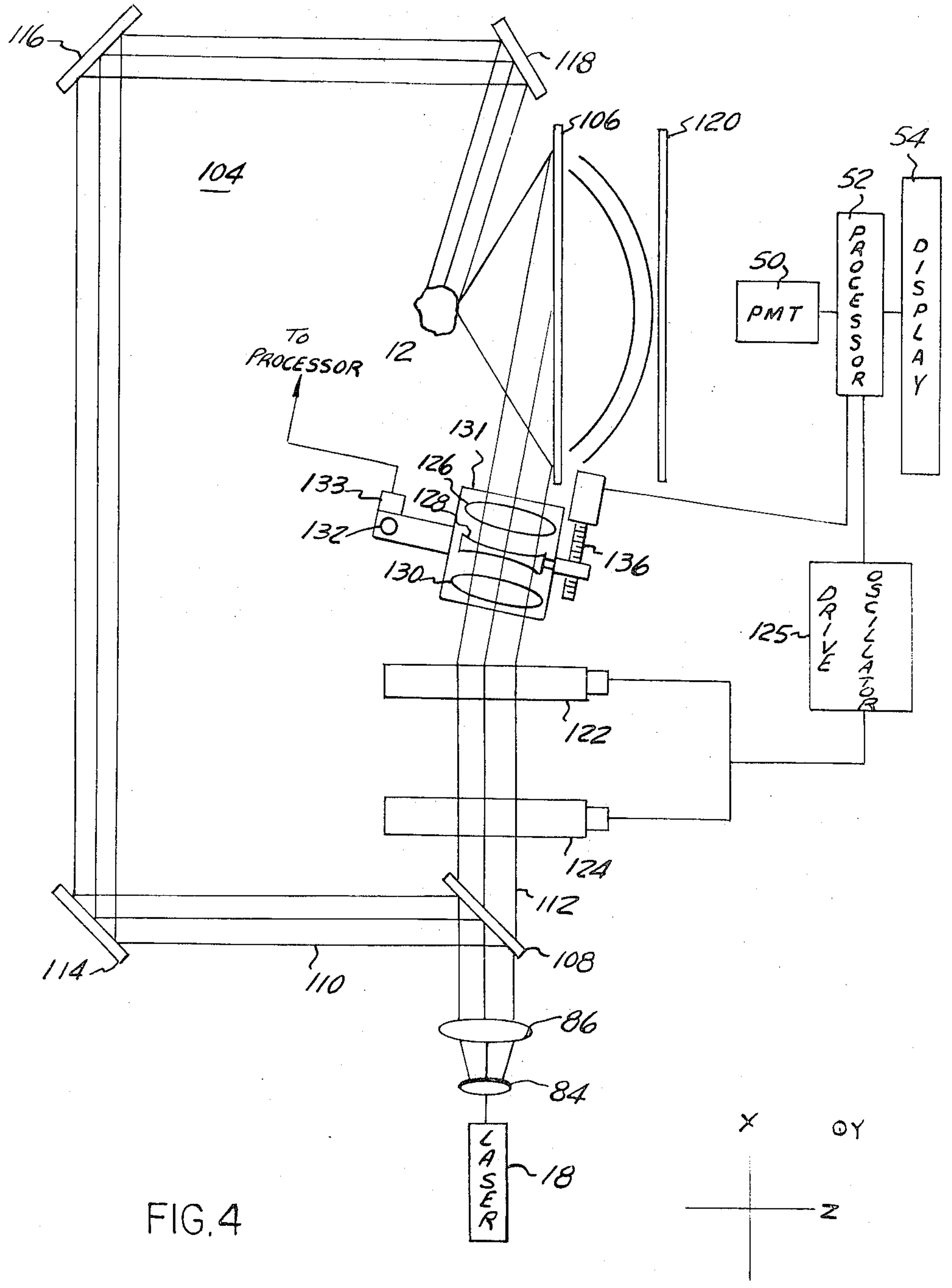
FIG. 4 is a plan, schematic view of a heterodyne imaging device that includes a hologram of a pinhole for providing interference patterns representing points on an object.

FIG. 4 illustrates a heterodyne imaging device 104 in which a hologram 106 of a pinhole is used to provide an interference pattern whose amplitude is varied to provide intensity representations of various points on object 12. Imaging device 104 includes laser generator 18, objective lens 84, collimating lens 86, and a beam splitter 108 for providing two beams 110 and 112 of laser light. Three mirrors 114, 116 and 118 direct beam 110 to strike and be scattered by object 12. Hologram 106 is positioned to receive light scattered from object 12. Hologram 106 also receives beam 112. Beam 112 is a reference beam and causes a light signal representing a pinhole or point source of light to propagate from hologram 106. This light signal mixes with light reflected from object 12 to provide an interference pattern representing a point on object 12. A diffuse transparent glass surface 120 receives and scatters this pattern. Photomultiplier tube 50, processor 52, and display 54 are positioned to receive and process wave energy scattered from diffuse surface 120 to provide an image of object 12.

Imaging device 104 also includes apparatus for scanning reference beam 112 to vary the interference pattern received by surface 120 to represent different points on object 12. This apparatus includes two acousto-optic deflectors 122 and 124 for providing X-axis variations in the angle at which reference beam 112 strikes hologram 106. Acousto-optic beam deflectors change the frequency of a received light beam as they deflect that beam. A drive oscillator 125 which drives deflectors 122 and 124 is therefore connected to processor 52. The signals from oscillator 125 identify the X-axis object position represented by a signal received by photomultiplier tube 50 as well as any amplitude variation in that signal caused by a change in the frequency of beam 112 and unrelated to differences between various points on object 12. Since it is only necessary to provide a very rapid scan along one dimension, mechanical apparatus is used to provide the slower Y and Z axis scans. This apparatus includes three lenses, 126, 128, and 130 mounted on a movable platform 131 that is moved along the Y-axis of device 104 by a screw 132 and motor 133. Lens 128 is connected to a motor 134 and screw 136 for moving that lens toward and away from lenses 126 and 130. The movement of lens 128 alters the convergence of beam 112 striking hologram 106 and varies the Z-axis position of the represented object point.

In operation, only the convergence of beam 112 and the angle at which that beam strikes hologram 106 are changed. The position at which beam 112 strikes hologram 106 is not changed. That is, beam deflectors 122 and 124 deflect beam 112 in opposite directions to insure that a change in the angle of beam 112 will not change the position at which that beam strikes hologram 106. Variation of reference beam 112 changes the amplitude of the interference pattern striking surface 120 and causes that pattern to represent different points on object 12.. Beam deflectors 122 and 124 provide an X-axis scan; movement of platform 131 provides a Y-axis scan, and movement of lens 128 Provides a Z-axis scan of the object point represented by the interference pattern striking surface 120. Photomultiplier tube 50 receives light from surface 120 and provides input signals to processor 52. Processor 52 also receives signals from drive oscillator 125 and motors 133 and 134 indicating the locations of points on object 12 represented by signals received by processor 52 from tube 50. The signals from oscillator 125 also identify variations in the input from tube 50 caused by frequency changes in beam 112 and unrelated to differences between points on object 12 so that those signals will not distort the image being formed. Device 104 thus provides an accurate, undistorted, high resolution image of object 12.

Figure 5:
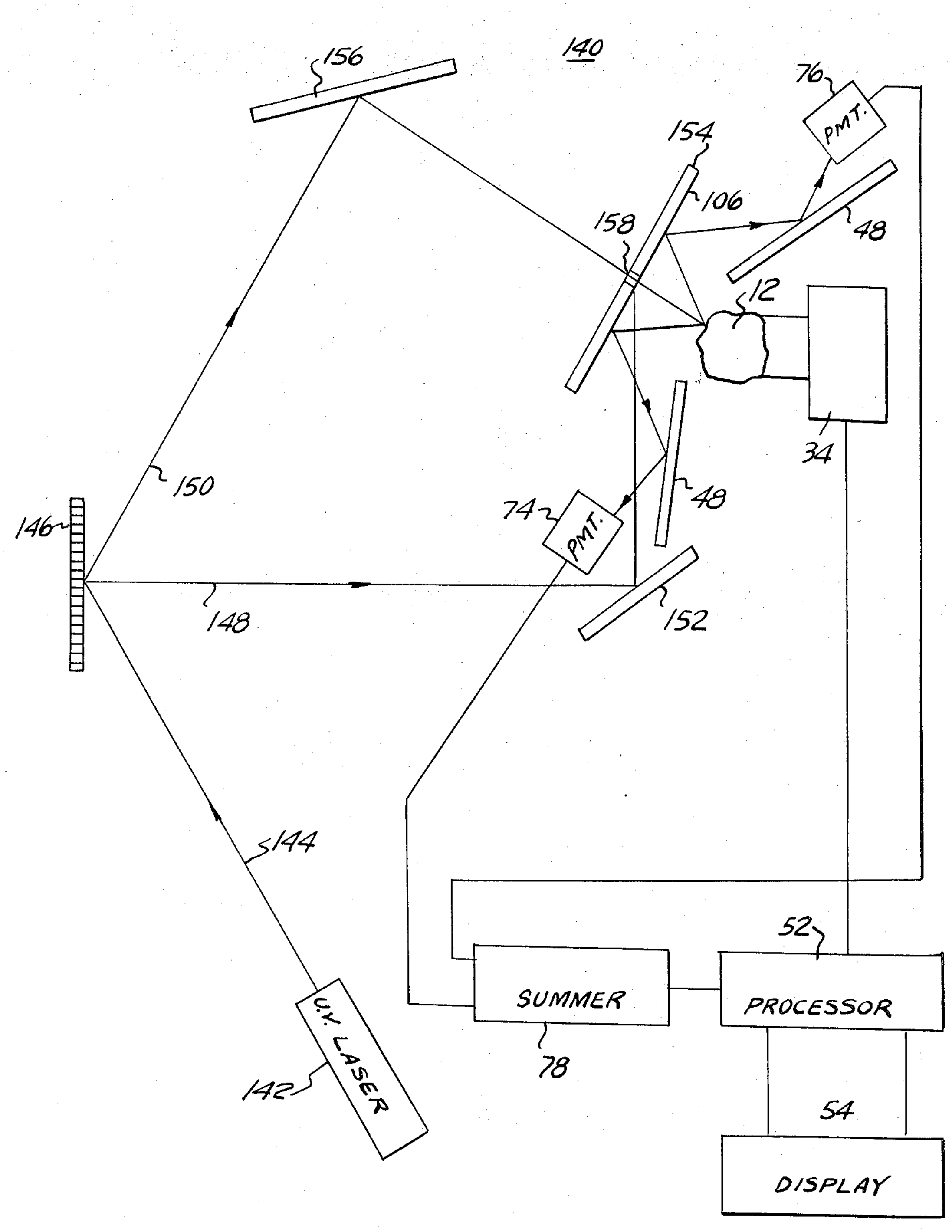
FIG. 5 is a plan, schematic view of an all-reflective heterodyne imaging device employing ultraviolet laser light to form an image.

FIG. 5 illustrates an all-reflective heterodyne imaging device 140 that utilizes ultraviolet laser light to form an image. Heterodyne device 140 includes a laser generator 142 which generates and directs a beam 144 of ultraviolet laser light to strike a reflective grating 146. Reflective grating 146 acts as a beam splitter and divides beam 144 into a reference beam 148 and an object beam 150. A mirror 152 which vibrates to change the frequency of beam 148 slightly is positioned to reflect that beam to strike hologram 106 recorded on a reflective metallic surface 154. A static or non-vibrating mirror 156 is positioned to reflect beam 150 through a hole 158 in surface 154 to strike object 12. Two diffusive reflecting surfaces 48 are positioned to receive light reflected from hologram 106 and scatter a portion of the received light to photomultiplier tubes 74 and 76. These photomultiplier tubes convert received light signals to electric signals which are supplied to the processing apparatus described previously in the embodiment of FIG. 3.

In operation, object beam 150 is reflected from object 12 to strike hologram 106. Hologram 106 reflects light from object 12 and also reflects reference beam 148 so that the two signals interfere to provide an interference signal representing a point on object 12. The scanning of object 12 causes beam 150 to strike different points on that object and thus changes the interference signal to represent different object points. The interference signal propagates from hologram 106 over a wide angle. Diffusive surfaces 48 receive and scatter portIons of this interference signal. Photomultiplier tubes 74 and 76 receive a portion of the scattered light and convert that light to electric signals that are used to form an image of object 12.

Having thus described several embodiments of this invention, a number of modifications will be obvious to those skilled in the art. For example, a modification of the device 56 illustrated in FIG. 3 can be constructed having additional diffuse signal receiving surfaces positioned in three dimensions in space to provide additional signals representing a point on the object being imaged. Or, as another modification of imaging device 56, the apertures 62 and 64 for providing diverging reference wave energy signals may be formed in the diffuse surfaces 58 and 60, and the separate surfaces having pinhole apertures formed therein can be eliminated. In addition, a modification of the device 104 illustrated in FIG. 4 can be constructed having several holograms for receiving light scattered in different directions from an object and providing various signals representing a point on that object. The various signals can then be summed to provide a summation signal to be used in forming an image of an object. As another example of a modification of device 104, the hologram 106 represents a point source of wave energy disposed at a position on the object 12. As reference beam 112 is scanned to generate wavefronts representing different object points, abberations such as coma and astigmatism are introduced into the system. The magnitudes of these aberrations are functions of the positional differences between the various object points and the position of the point source represented by the hologram 106. It is known in the optic art that a glass plate receiving a light wave at an angle introduces aberrations such as coma and astigmatism into the light wave. And, aberrations of any predetermined magnitude may be introduced by appropriately selecting the thickness, angle, and refractive index of the glass plate. Therefore, glass plates can be disposed between hologram 106 and object 12, and between hologram 106 and the apparatus for scanning reference beam 112 to introduce aberrations that compensate for aberrations from the hologram. Therefore, what is claimed is:

I claim:

1. A heterodyne device for providing a high resolution image of an object comprising:

means for providing a wavefront having an amplitude representative of a point on the object;

means for varying said wavefront to sequentially provide amplitude representations of different points on said object;

means for providing a signal identifying the locations of the represented object points;

a diffusive surface for receiving and scattering at least a substantial portion of said wavefront; and signal processing means for using said signal and wave energy scattered from said diffusive surface to form an image of said object, the resolution of said image being determined at least in part by the percentage of the cross-sectional area of said wavefront from which said imaging means receives wave energy, said diffusive surface directing at least a portion of the wave energy striking each position on said surface to said processing means and thereby causing the resolution of said image to be at least partially dependent on the area of said diffusive surface and to be independent of the signal receiving area of said processing means.

2. The heterodyne device of claim 1 wherein said wavefront comprises an interference pattern, and said means for providing said wavefront includes:

means for directing a first wave energy signal to strike and be scattered and modulated to thereby provide a modulated wave energy signal having a large cross-sectional area and representing said object;

a hologram of a pinhole aperture disposed to receive by the object said modulated wave energy from said object; and means for directing a reference beam of wave energy having a frequency slightly different from the frequency of said modulated wave energy to also strike said hologram, said hologram modulating received wave energy and providing a temporally varying interference pattern having an amplitude representing a point on said object.

3. The heterodyne device of claim 2 in which said varying means comprise means for varying the convergence of said reference beam and for varying the angle at which said reference beam strikes said hologram to thereby change the location of the point on said object represented by said interference pattern.

4. The heterodyne device of claim 1 wherein said wavefront comprises an interference pattern, and said means for providing said wavefront include:

means for directing a first wave energy signal to strike and be modulated and scattered by the object to thereby provide a modulated wave energy signal having a large cross-sectional area and representing said object; and means for providing a second wave energy signal representing a point source of wave energy and for directing said second signal to interfere with said modulated signal, said second signal having a frequency slightly different from the frequency of said modulated signal and thereby providing a temporally varying interference pattern comprising said wavefront.

5. The heterodyne device of claim 4 in which the resolution of the image is at least partially determined by the sensitivity of the device to variations between signals representing different points on the object, and the device includes apparatus for increasing the resolution of the image comprising:

means for providing a second temporally varying interference pattern representing the same object point represented by said interference pattern;

a second diffusive surface for receiving at least a substantial portion of said second interference pattern and for scattering wave energy from said second pattern to said signal processing means; and means for utilizing wave energy scattered from said diffusive surface and wave energy scattered from said second diffusive surface to provide a summation signal, the variation of said interference patterns to represent different object points providing said summation signal with larger amplitude variations that are more easily detected and processed by said signal processing means than the amplitude variations of anY of the components of said summation signal.

6. The heterodyne device of claim 4 in which:

said means for directing said second wave energy signal comprise reflective means for directing said second signal to interfere with wave energy modulated and scattered by the object; and said diffusive surface for receiving and scattering at least a substantial portion of said interference wavefront comprises a reflective diffusive surface, said heterodyne device thereby comprising an all-reflective device permitting image formation utilizing ultraviolet laser light.

7. The heterodyne device of claim 6 in which said reflective means for directing said second signal to interfere with wave energy modulated by said object comprise a reflective hologram representing a point source of wave energy proximate the object.

8. The heterodyne device of claim 4 in which said means for providing and directing said second wave energy signal include:

means defining a pinhole aperture for receiving wave energy and causing said received wave energy to propagate in a diverging distribution, said diverging distribution comprising said second signal; and a beam splitter for receiving and superposing said modulated signal and said second signal to provide said interference pattern, said beam splitter being positioned to project an image of said aperture onto a point on said object, said interference pattern representing the point on said object receiving said projected image.

9. The heterodyne device of claim 8 wherein said varying means comprise means for providing a relative movement between said object and said pinhole aperture to scan said projected image of said aperture across said object and thereby vary the amplitude of said interference pattern to represent different points on the object.

10. The heterodyne device of claim 8 in which:

said means for providing and directing said second wave energy signal include means for directing a beam of wave energy having a frequency slightly different from the frequency of said modulated signal along a straight line path toward said object; and said pinhole aperture and said beam splitter are disposed along said path with said beam splitter disposed between said object and said aperture to provide a compact structure.

* * * * *